United States Patent [19]
Howard

[11] 3,921,447
[45] Nov. 25, 1975

[54] DRILLING FORCE INDICATOR

[75] Inventor: Mig Allen Howard, Houston, Tex.

[73] Assignee: Hughes Tool Company, Houston, Tex.

[22] Filed: Feb. 24, 1975

[21] Appl. No.: 550,059

[52] U.S. Cl. .................................................. 73/151
[51] Int. Cl.² ........................................ E21B 47/00
[58] Field of Search....... 73/151, 151.5, 152, 141 R; 175/27, 40; 100/90

[56] References Cited
UNITED STATES PATENTS 2,851,880   9/1958   Fiedler................................ 73/141 R
3,759,092   9/1973   Fishel.................................. 73/141 R

OTHER PUBLICATIONS

McGhee, E., Two-man crew operates hydraulic rig. From Oil and Gas Journal, Sept. 22, 1958, pp. 92–98.

*Primary Examiner*—Jerry W. Myracle
*Attorney, Agent, or Firm*—Robert A. Felsman

[57] ABSTRACT

A drilling system is disclosed that adds the hydraulic forces acting on the piston of a hydraulic cylinder to the weight of the drill stem and bit for visual display indicative of the total force applied to the earth by the bit.

2 Claims, 1 Drawing Figure

DRILLING FORCE INDICATOR

BACKGROUND OF THE INVENTION

1. Field of the Invention:

This invention relates in general to force indicators useful in earth boring machines of the type having hydraulic cylinders to force a drill bit against the earth.

2. Description of the Prior Art:

Machines using hydraulic cylinders to force a drill bit into the earth are commonly used. Force indicators visually display forces resulting from the fluid pressures in the hydraulic cylinders used to thrust a bit into the earth. Additionally, a force indicator may be used to display the weight of the drill stem and bit. There exists a need, however, for an improved indicator system that accurately and simply combines in a reliable and advantageous manner the forces produced by the hydraulic cylinders with the weight of the drill stem to indicate the total force exerted by the bit against the earth. The successful system should be capable of adding or subtracting the weight of the drill stem in a shaft drilling machine that either thrusts a bit away from the machine, or pulls the drill stem and bit toward the machine.

SUMMARY OF THE INVENTION

This invention is a method and system enabling visual display of the total force exerted by the bit against the earth. The total force includes those forces exerted by the fluid pressures in the motivating hydraulic cylinders and the weight of the drill stem and bit. Accurate display is achieved whether drilling is toward or away from the machine. In general this result is achieved with pressure transducers that communicate with the fluid in upper and lower chambers defined by the piston and walls of a hydraulic cylinder to convert sensed fluid pressures into electrical signals. Means connected with one of the transducers biases the associated signal to a value proportional to the weight of the drill stem and bit. Amplifier means multiplies the resulting signals proportional to the areas of the piston exposed to the fluid in the upper and lower chambers. A summing amplifier determines the difference between the multiplied signals, which is visually displayed to indicate the force exerted by the bit on the earth.

DESCRIPTION OF THE PREFERRED EMBODIMENT

Figure 1:
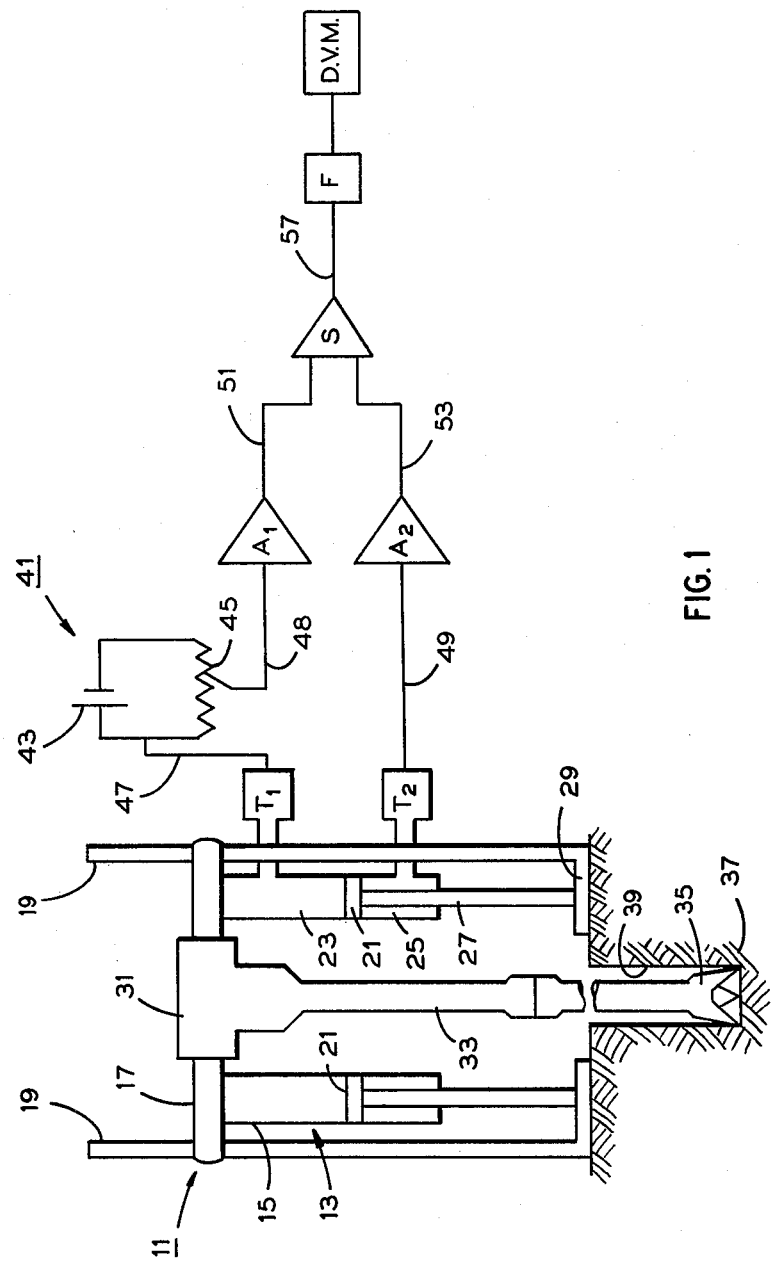
FIG. 1 is a schematic diagram of an earth boring machine employing the principles of the inventions.

The numeral 11 in FIG. 1 of the drawing designates an earth boring machine of the type using hydraulic cylinders 13 with the cylinder end 15 attached to a reciprocable cross member 17 adapted to slide axially along masts 19. A piston 21 separates each cylinder housing into an upper chamber 23 and a lower chamber 25. A rod 27 is connected to a frame member 29 used to support the masts 19.

The particular machine illustrated schematically in FIG. 1 has a power swivel 31 adapted to support and rotate drill stem 33, generally composed of individual and separable drill stem sections terminated by in a drill bit 35 urged against the earth 37 to form a bore hole 39. Such machines have been commercially available for a number of years and are used for shaft drilling in which the drill bit 35 is thrust away from the machine 11, as shown in FIG. 1, or in which the drill bit is pulled through a pilot hole (not shown) toward the machine.

It is beneficial that the machine operator has available information to determine the total force exerted by the drill bit as it is thrust against the earth. This total force includes the thrust supplied by the hydraulic cylinders and the weight of the drill stem and bit, including all weight supported by the cylinders.

As shown in FIG. 1, an upper pressure transducer $T_1$ communicates with the fluid in the upper chamber 23 of the cylinder to sense fluid pressures for conversion to proportional output electrical signals. Similarly, a lower pressure transducer $T_2$ communicates with the fluid in the lower chamber 25 of the hydraulic cylinder 13 for conversion to proportional output electrical signals. The pressure transducers $T_1$ and $T_2$ may be of the strain gage type.

Means 41 are connected with the output of a selected one of the upper and lower pressure transducers $T_1$, $T_2$ for biasing the output signal proportional to the weight of the drill stem and bit when suspended in the bore hole as will be explained more fully subsequently. In FIG. 1 the means 41 is illustrated as including a power source 43 in a circuit including a variable resistor 45 used to impress a selected signal (here voltage) on the output signal of transducer $T_1$ in a conductor 48. This means could also be a potentimeter since the invention is not restricted to use with any particular form of electrical apparatus.

The unbiased output signal of transducer $T_1$ is received from conductor 47 by an amplifier means $A_1$ that converts the signal to another signal proportional to the hydraulic cylinder force acting on the piston 21. The resulting signal is an electrical analog of the force resulting from the multiplication of the fluid pressure in chamber 23 by the area of the upper surface of piston 21. A similar amplifier means $A_2$ receives through conductor 49 a signal from pressure transducer $T_2$ for conversion to a hydraulic force acting on the lower surface of piston 21. The amplified and resulting signals from amplifier means $A_1$, $A_2$ are received from conductors 51, 53 by a summing amplifier means S that determines the difference between the received signals. The determined difference is received by conductor 57 and a suitable display means, which as shown in FIG. 1 comprises a filtering circuit F having an output suitable for input to a digital voltmeter that displays a representation of the signal in convenient reference units such as pounds. The display means can have other forms such as a meter calibrated in units of force and should be by some means capable of indicating negative as well as positive results.

In operation the total indicated force includes that exerted by the hydraulic cylinders and includes the weight of the drill stem and bit when using the following operational method. First, the fluid pressure in the upper chamber 23 is sensed by the transducer $T_1$ and converted into a proportional output electrical signal in conductor 47. The fluid pressure in chamber 25 is sensed by the transducer $T_2$ and converted into a proportional output electrical signal in conductor 49. To include the weight of the drill stem and bit (including other weight such as that of power swivel 31 and cross member 17) the bit is suspended in bore hole 39 above the bore hole bottom so that a resulting fluid pressure proportional to the weight of the drill stem and bit is sensed by the pressure transducers, converted to electrical output signals amplified and fed through summation amplifier S and displayed on digital voltmeter DVM. Since the force produced by the fluid pressure in chamber 25 differs from the force in chamber 23, the digital voltmeter will display a difference. Then the means 41 is used to bias the output signal from transducer $T_1$ such that zero force is indicated by the digital voltmeter. Next the hydraulic cylinders are actuated by pump means (not shown) to increase the pressure in chamber 25 to thrust the bit 35 against the earth. Thus the output of the digital voltmeter DVM will reflect the thrust on the bit exerted by the hydraulic cylinders and also the weight of the drill stem and bit.

The operation of the invention may be better understood perhaps in view of the following analysis: When the bit is suspended in the bore hole there is generated an output signal $P_1$ by transducer $T_1$ and another output signal $P_2$ by transducer $T_2$. When amplified to signals representing the forces on the piston, the difference in the force signals is equal to a constant K representative of the weight of drill stem and bit ($W_s$), as shown by the formula $P_1A_1-P_2A_2=W_s=K$. The biasing of the signal from transducer $T_1$ by means 41 in effect adjusts the constant K such that the above formula may be written $P_1A_1-K-P_2A_2=0$. Thus the output of the display means DVM indicates zero. When the bit is thrust against the earth, a resulting force is indicated on the display means. This force represents the total force exerted by the bit against the bottom of the bore hole is thereby indicated.

While the invention has been shown in only one of its forms, it should be apparent that it is not thus limited but is susceptible to various changes and modifications. The total drilling force may be achieved and displayed when the machine of FIG. 1 is used to drill upward with the drill stem in a pilot hole. Other modifications will be apparent to those skilled in the art from the foregoing description.

I claim:

1. In an earth boring machine of the type utilizing at least one hydraulic cylinder including a piston defining an upper chamber and a lower chamber that receive and discharge fluid to move linearly drill stem and bit, the improvement comprising:

an upper pressure transducer communicating with the fluid in the upper chamber to sense fluid pressures for conversion to proportional output electrical signals;

a lower pressure transducer communicating with the fluid in the lower chamber to sense fluid pressures for conversion to proportional output electrical signals;

means connected with a selected one of the upper and the lower pressure transducers for biasing the associated signal proportional to the weight of the drill stem and bit;

amplifier means for multiplying the resulting signals proportional to the areas of the piston exposed to the fluid in the upper and lower chambers;

summing amplifier means for determining the difference between the multiplied signals; and display means connected with the summing amplifier means for visual display of said difference to indicate the forces exerted by the bit on the earth.

2. The method of measuring the total drilling force exerted resulting from the weight of the drill stem and bit in addition to that exerted by fluid in upper and lower chambers of a hydraulic cylinder used to move the drill stem, said method comprising the steps of:

sensing the fluid pressure in the upper chamber and converting this pressure to an output electrical signal;

sensing the fluid pressure in the lower chamber and converting this pressure to an output electrical signal;

amplifying each output signal to a value proportional to the hydraulic forces acting on the piston by the fluid in the upper and lower chambers;

determining the difference between the signals that are proportional to said hydraulic forces;

displaying visually said difference;

suspending the bit in the bore hole with the fluid in said chambers to produce pressures and associated output signals proportional to the weight of the drill stem and bit;

biasing at least one of said output signals such that said difference is zero;

drilling with the bit against the earth;

whereby the determined and displayed difference is representative of the force of the bit on the earth.

* * * * *